March 19, 1968 D. COSTES 3,374,147
SAFETY SYSTEM FOR PRESSURE TUBE REACTORS
Filed June 28, 1966
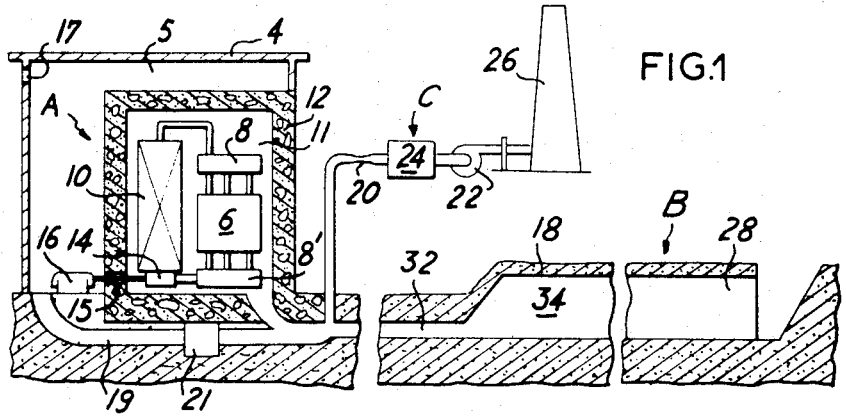
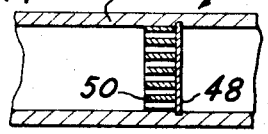
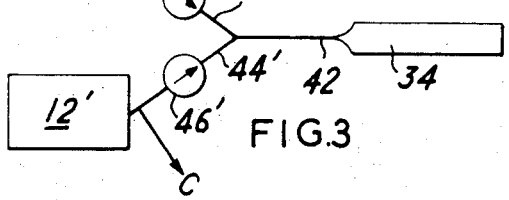
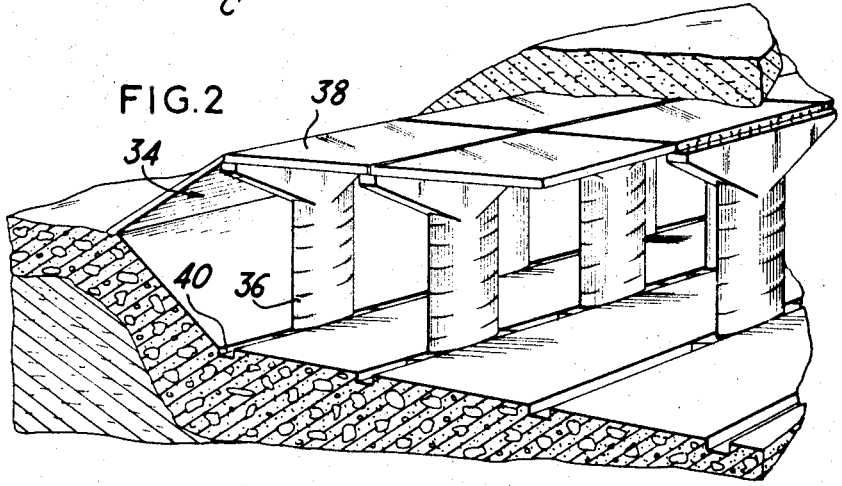
INVENTOR
DIDIER COSTES
BY Bacon & Thomas
ATTORNEYS

United States Patent Office 3,374,147
Patented Mar. 19, 1968

3,374,147
SAFETY SYSTEM FOR PRESSURE TUBE
REACTORS
Didier Costes, Paris, France, assignor to Commissariat à l'Énergie Atomique, Paris, France
Filed June 28, 1966, Ser. No. 561,156
Claims priority, application France, July 2, 1965, 23,368
6 Claims. (Cl. 176—37)

ABSTRACT OF THE DISCLOSURE

The discharge duct has vertical pillars profiled in the direction of gas flow for cooling fluid released upon failure of a reactor cooling circuit and for directing the flow of said fluid axially of the safety chamber. The discharge duct has a volume which is at least equal to that of the reactor heat exchange fluid when it is cooled. An auxiliary decontamination discharge circuit is connected in parallel with the safety chamber and includes in series, a sonic venturi tube, a bank of decontamination filters, a blower and an exhaust stack.

---

This invention is directed to a safety system for nuclear reactors of the pressure tube type which are cooled by pressurized gas, said safety system being provided in the event of accidents which are liable to give rise to a substantial release of gas.

The most serious accident which can be contemplated in a reactor of this type is the complete failure of a manifold between the reactor and the heat exchangers. In order to limit the consequences of such a failure, it is advisable on the one hand to limit the diameters of these manifolds (thereby limiting the maximum leakage rate) and on the other hand to provide the coolant with an expansion volume having both a geometry and mechanical strength such that the contaminated gas can escape to the surrounding atmosphere only through filters which retain the contaminants.

The soluton which has usually been adopted up to the present time consists in endowing the reactor building with sufficient resistance to internal overpressures to permit of containment of the gas pressure in the event of duct or manifold failure. This soluton has one obvious drawback in that it requires the construction of a reactor building which affords sufficient leak-tightness and which can withstand a relatively high overpressure, thus entailing a substantial increase in capital cost.

The present invention is directed to the design concept of a system which meets practical requirements more effectively than the solutions of the prior art, especially insofar as it permits a conventional design of reactor building while calling for only relatively small modifications in the nuclear plant proper.

To this end, the invention proposes a safety system for pressure tube reactors which comprises a containment vessel inside which are located all the primary coolant circuit components of the reactor and a discharge duct which has a high volume respect to that of said containment vessel and which connects said vessel to the atmosphere, said containment vessel being designed to afford resistance to an overpressure which corresponds to the fracture of a primary circuit manifold, said overpressure being limited by the escape of coolant into said discharge duct from which air is driven out by said coolant under normal operating conditions.

According to a preferred embodiment of the invention, said containment vessel inside which the primary circuit components are located (and especially the reactor and heat exchangers) also constitutes the biological shield structure of the reactor.

The discharge duct referred-to above has preferably a volume of the same order of magnitude as that which contains the coolant when this latter is expanded to atmospheric pressure and restored to ambient temperature: this expedient prevents the coolant from being discharged to the atmosphere, provided that precautions are taken to cool the gas during its passage through the duct. The contamination is thus contained in the duct and its diffusion towards the outlet can be prevented by reverse blowing.

The invention also consists in other arrangements which are advantageously employed in conjunction with the preceding but which may be employed independently thereof. A better understanding of the invention will be obtained by perusal of the following description, reference being made to the accompanying drawings in which one mode of application of the invention is shown by way of non-limitative example.

In the drawings:

FIG. 1 shows very diagrammatically a safety system in accordance with the invention;

FIG. 2 shows diagrammatically a safety chamber which can be employed in the system of FIG. 1;

FIG. 3 shows diagrammatically the association of two nuclear reactors with a single safety system which can operate so as to protect either one reactor or the other;

FIG. 4 shows diagrammatically a detail of FIG. 3.

The outer containment shell or building 4 of a nuclear reactor A and the safety system B which is associated therewith are shown in elevation in FIG. 1. The reactor 6 proper and the complete primary coolant circuit of the reactor as represented diagrammatically by the manifolds 8 and 8' and the heat exchanger 10 are enclosed within an inner containment vessel 12 which constitutes a biological shield. The reactor is, for example, of the type which is moderated by heavy water and cooled by circulation of pressurized carbon dioxide gas. The coolant can be circulated by means of a blower 14 which is driven by a motor 16 which is placed outside of the inner containment vessel 12.

The safety system B in accordance with the invention is associated with the reactor A and essentially comprises a duct 18 which has a large volume compared with that of the chamber 11 located inside the containment vessel 12 and which connects said chamber 11 to the atmosphere. Said duct is advantageously given a flat shape over the major part of its length and formed of prefabricated concrete elements covered with an earth packing having a thickness which can be, for example, of the order of one meter; one preferred mode of construction of this duct, while in no way exclusive, will be described hereinafter. The duct 18 is also connected to the atmosphere by way of a discharge circuit C which comprises in series a sonic venturi tube or throat 20 for protecting the remainder of the circuit, a bank of filters 24, a blower 22 and if necessary an exhaust stack 26.

The containment vessel 12 must obviously be so constructed as to afford resistance to the transient overpressure which develops as a result of a burst manifold 8 or 8': this overpressure, which is in turn a function of the sizes and geometrical characteristics of the duct 18, is preferably set at a maximum value of the order of 1 to 2 bars: it is in that case merely necessary to construct the vessel 12 of lightly reinforced concrete.

It will appear evident that a wide range of different possibilities is open to selection for the construction of the duct 18 and that the final choice will be primarily dependent on the nature of the ground in which it is laid. The duct 18 which is illustrated in FIGS. 1 and 2 is made up of two sections disposed in series. The first section is constituted by flues 32 for connecting the vessel 12 to the second section, said second section being formed by a safety chamber 34 which opens to the atmosphere at 28. The flues 32 are preferably as short as possible and as large in cross-sectional area as possible in order to reduce pressure drop and overpressure within the vessel 12. The chamber 34 must comply with two essential requirements: on the one hand, it must afford resistance to the overpressure which develops at the time of failure of the primary circuit of the reactor; on the other hand, it must ensure sufficient cooling of the gases derived from the chamber 11 and must consequently provide said gases with a sufficient contact surface area.

The chamber 34 which is shown in FIG. 2 has a flat shape and substantial width compared with its height. Said chamber comprises prefabricated elements of reinforced concrete which constitute vertical pillars 36 having a profiled cross-section in the direction of the gas flow, firstly in order to provide a sufficiently large area of contact with the gas to cool this latter to the design value and secondly in order to promote an interstage flow pattern which regularizes axial flow velocities in each transverse section and prevents mixing in accordance with the conventional grid system employed in wind tunnels. The pillars 36 are anchored to longitudinal concrete members placed in troughing 40 and to horizontal slabs such as the slab 38. The slabs 38 can be simply anchored both to each other and to the pillars without interposition of expansion joints provided that the chamber is shored with a layer of earth which regularizes temperature variations. The earth embankment which is thus formed has a thickness of the order of one meter, or calculated to ensure that the pressure exerted by said embankment is sufficient to counterbalance transient overpressure and prevent any uplifting during operation of the system; this semi-embedded construction with only slight anchorage to the ground permits of economical construction.

The operation of this system is readily apparent: in the event of rupture of a manifold, the gas which escapes fills the chamber 11 and drives out of the duct 18 the air which is contained therein. The auxiliary circuit C is protected by the presence of the sonic throat 20 which limits the velocity of flow and therefore the flow rate and overpressure which are established, especially in the filters. The gas is cooled as it comes into contact with the walls of the duct 18 at the same time as it expands within said duct. It must be noted that the penetrations such as 15 through the wall of the inner containment vessel 12 must be limited in number or so designed as to prevent the discharge of an excessive quantity of gas into the chamber 5 which is formed within the reactor building and outside of the containment vessel 12. However, leak-tightness does not need to be absolute, on condition that the reactor building 4 is provided with openings to the exterior such as the opening 17, the cross-sectional area of which is sufficient to limit the overpressure to a permissible value which is much lower than that of the containment vessel 12. Said openings 17 should be located at a sufficient distance from the penetrations 15 in order that the fission products which might pass from the chamber 11 to the chamber 5 are not liable to be discharged to the atmosphere. In the case in which the reactor building 4 houses sections of the primary circuit which could not have been disposed within the inner containment vessel 12, and in particular a refuelling machine which can be connected to the primary circuit during operation, it is important to guard against failure of these sections. The probable rate of leakage therefrom is therefore calculated. If this rate is low, the leakage can be discharged towards the chamber 11 through the penetrations 15 and towards the exterior through the openings 17 which are preferably fitted with filters. Should said leakage rate be higher, provision must be made for a discharge duct 19 which extends from the chamber 5 to the safety duct 18 with interposition of a valve 21 which permits the flow of gas only in the appropriate direction.

Once the transient period is passed and the pressure is generally in the vicinity of atmospheric pressure, the gases contained in the duct 18 can be prevented from discharging to the atmosphere via the duct extremity 28 by starting up the blower 22 of the auxiliary circuit C so as to establish a counter-circulation, the gases being accordingly returned to the atmosphere after decontamination across the filters 24.

By way of example, it would be possible to adopt the following parameters for the safety system of a 500 mwe. reactor which is moderated by heavy water and cooled by carbon dioxide gas, the primary circuit of which contains 70 tons of carbon dioxide gas at a mean pressure of 60 bars and at a mean temperature of 375° C. If the inner containment vessel 12 has a volume of 5000 m.$^3$ and the duct 18 affords a gas expansion volume of 50,000 m.$^3$, then a transient overpressure which is less than 2 bars within the biological shield structure of 5000 m.$^3$ and 0.16 bar within the discharge duct and a maximum temperature of the order of 60° C. for a primary circuit leakage cross-section of 1 m.$^2$ will accordingly be obtained if the following characteristics are adopted:

Flues 32: 200 m. in length and 30 m.$^2$ in cross-sectional area;

Safety chamber 34: 200 m. in length, 5 m. in height and 40 m. in width (contact surface area of the order of 1 m.$^2$ per m.$^3$);

Pillars: Height of 5 m. and spacing of 2 m., and constituting longitudinal partitions which are open in a proportion of 50% and provide a contact surface area of the order of 0.9 m.$^2$ per m.$^3$ of gas.

The foregoing example corresponds to a duct which comprises serially disposed flues 32 and a safety chamber 34; it is possible to make provision for a wide direct communication between the inner containment and shield structure 12 and the chamber 34 if an overpressure of 0.33 bar is attained, for example, between the same containment structure as above and a duct having a cross-sectional area of 200 m.$^2$ for a length of 250 m.

In each particular case, special arrangements can be made to improve the funnelling of the gas within the duct and the flow from the flues to the containment vessel. These arrangements are conventional and therefore need not be described.

By way of comparison, it can be noted that the use of a safety containment vessel of 55,000 m.$^3$ results in an overpressure of 1.40 bar. Inasmuch as the capital cost is largely dependent on the product of volume and overpressure, the economy which is achieved in the case considered above can readily be visualized.

The system in accordance with the invention offers an advantage in that it can be common to a number of reactors, as shown in the diagram of FIG. 3. In this figure, the reactors 12 and 12' are both connected to a same chamber 34 by means of flues comprising a section 42 which is common to both reactors and sections 44 and 44' for respective connected to the reactors 12 and 12'. In this case, in order that any accident occurring in one of reactors should be prevented from causing an overpressure throughout the circuit as well as disturbances within the other reactor, provision is made within the channels 44 and 44' for non-return isolating valves 46 and 46'. The purpose of said valves is to permit the expansion of the gas from the reactor towards the chamber 34 while preventing any back-flow. In the embodiment which is shown in FIG. 4, the isolating valve 46 is constituted by a diaphragm 48 of thin sheet metal which is applied against a grid 50; the diaphragm bears on the grid 50 and offers resistance to any overpressures which are exerted from the downstream side towards the upstream side. On the contrary, the diaphragm 48 fractures in the event of overpressure from the upstream side to the downstream side and permits the expansion of gases flowing from the reactor towards the chamber 34.

In an arrangement as hereinabove described, the auxiliary circuits C and C' are connected upstream of the isolating valves 46 and 46' and operate continuously, thereby ensuring normal ventilation of the reactor buildings. In the case of a single reactor, normal ventilation can be assigned to circuit C, but provision must be made on the downstream side for a valve of similar design to the valve 46 in order to prevent any air from being admitted through the duct 18.

The foregoing description shows that it is possible by means of the system in accordance with the invention to provide virtually total safety in the case of pressure tube reactors. The installations employed for the achievement of this objective are relatively low in cost inasmuch as their order of magnitude is three to four times smaller than that of a containment vessel of the type which is designed to afford resistance to the total overpressure. Safety is evidently increased inasmuch as the leakage problem disappears and the presence of high overpressures is avoided.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

What I claim is:

1. In a nuclear reactor plant comprising a containment vessel, a pressure tube reactor in said vessel, and means for circulating a reactor coolant in a primary cooling circuit located within said containment vessel, a safety system for cooling and reducing the pressure of the coolant gas or steam release in said vessel upon reactor or primary circuit failure, said system comprising a discharge duct connecting said containment vessel to atmosphere and having a volume at least equal to that of said released coolant gas or steam when at atmospheric pressure and ambient temperature, said discharge duct, at the end opposite that connected to said containment vessel, being open and having unrestricted communication with the atmosphere and including means for cooling to ambient temperature said released gas or steam passing therethrough and for guiding said released gas or steam in an axial flow pattern thereby preventing mixing of atmospheric air normally present in said discharge conduit with said released gas or steam as said atmospheric air is displaced through said open end to atmosphere by said released gas or steam, said containment vessel and discharge duct being designed to withstand without damage, that transient overpressure which corresponds to failure conditions of said reactor or said primary circuit.

2. A safety system in accordance with claim 1, wherein said discharge duct has a flat cross-sectional configuration and said means for cooling and guiding said released gas or steam comprises vertical flow-guiding pillars.

3. A safety system in accordance with claim 1, wherein said containment vessel is constituted by a biological shield structure and also contains heat exchange means through which heat is transferred from the primary fluid to a secondary fluid.

4. A safety system in accordance with claim 1, wherein said discharge duct is connected to the atmosphere via a drain circuit comprising a protection venturi-tube, filters and a blower for discharging to the atmosphere.

5. A safety system in accordance with claim 1 which is common to a number of reactors, and wherein said discharge duct is separated from each reactor by means of an isolating valve which is designed to fail in the event of a predetermined overpressure in the respective shield.

6. In a nuclear reactor plant comprising a biological shield, a pressure tube reactor in said shield, a primary reactor cooling circuit in said shield, and heat exchanger means between the reactor cooling fluid and a secondary fluid in said shield, a safety system for cooling and reducing the pressure of gas or steam released in said shield upon reactor or primary circuit failure, said system comprising a discharge duct connecting said shield to atmosphere, which has a volume at least equal to that of said gas when at atmospheric pressure and ambient temperature, which is of flat cross-sectional shape over the major part at least of its length and which is provided with flow-guiding pillars for cooling the gas and preventing contaminated gases released from mixing with the air which is normally present within the discharge duct and which is driven out of said duct, and a drain circuit connecting said discharge duct to atmosphere and including a sonic throat, filter means and blower means for discharging gas from the duct to the atmosphere, said biological shield and discharge duct being designed to withstand without damage, that transient overpressure which corresponds to failure conditions of said reactor or said primary circuit.

References Cited

UNITED STATES PATENTS

| 3,232,843 | 2/1966 | Went et al. | 176—37 |
| 3,248,298 | 4/1966 | Norman | 176—37 |
| 3,301,761 | 1/1967 | Johnson et al. | 176—37 |

FOREIGN PATENTS

| 862,624 | 3/1961 | Great Britain. |

REUBEN EPSTEIN, *Primary Examiner.*